(12) United States Patent
Hu

(10) Patent No.: US 11,561,443 B2
(45) Date of Patent: Jan. 24, 2023

(54) PIXEL STRUCTURE COMPRISING TWO RED SUB-PIXELS HAVING EQUAL AREAS, TWO GREEN SUB-PIXELS HAVING EQUAL AREAS, AND A BLUE SUB-PIXEL HAVING A GREATER AREA THAN THE TWO GREEN SUB-PIXELS AND A SMALLER AREA THAN THE TWO RED SUB-PIXELS

(71) Applicant: HKC CORPORATION LIMITED, Shenzhen (CN)

(72) Inventor: Shuixiu Hu, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/290,268

(22) PCT Filed: Mar. 7, 2019

(86) PCT No.: PCT/CN2019/077307
§ 371 (c)(1),
(2) Date: Apr. 30, 2021

(87) PCT Pub. No.: WO2020/093636
PCT Pub. Date: May 14, 2020

(65) Prior Publication Data
US 2021/0382360 A1 Dec. 9, 2021

(30) Foreign Application Priority Data
Nov. 7, 2018 (CN) .......................... 201811321376.7

(51) Int. Cl.
*G02F 1/1362* (2006.01)
*G09G 3/36* (2006.01)

(52) U.S. Cl.
CPC ..... *G02F 1/136222* (2021.01); *G09G 3/3607* (2013.01); *G02F 2201/52* (2013.01)

(58) Field of Classification Search
CPC .................................................. G02F 2201/52
See application file for complete search history.

(56) References Cited

U.S. PATENT DOCUMENTS

2007/0064020 A1\* 3/2007 Credelle .............. G09G 3/3607
345/694
2016/0103352 A1 4/2016 Sugiyama et al.
(Continued)

FOREIGN PATENT DOCUMENTS

CN 104217670 A 12/2014
CN 105487308 A 4/2016
(Continued)

OTHER PUBLICATIONS

Jianliang Wang, the International Searching Authority written comments, dated Jul. 2019, CN.
(Continued)

*Primary Examiner* — Paul C Lee

(57) ABSTRACT

This application provides a pixel structure and a display device thereof. The pixel structure includes: a plurality of pixel regions, each of the pixel regions including a plurality of sub-pixels, the plurality of sub-pixels of each pixel area including the first sub-pixel, and the first sub-pixel is configured at the center of each pixel area; sub-pixels of the remaining colors in the plurality of sub-pixels of each pixel area are centered on the first sub-pixel, configured on both sides of the first sub-pixel; and a color filter layer including a plurality of color resist layers, where the plurality of color resist layers are arranged corresponding to positions and colors of the plurality of pixel regions.

1 Claim, 8 Drawing Sheets

(56) References Cited

U.S. PATENT DOCUMENTS

2016/0204094 A1* 7/2016 Yang ................ H01L 27/124
                                                    257/773
2017/0213850 A1* 7/2017 Dong ................ G02B 5/201

FOREIGN PATENT DOCUMENTS

| CN | 105807508 A |   | 7/2016 |
|----|-------------|---|--------|
| CN | 106373492 A | * | 2/2017 |
| CN | 106373492 A |   | 2/2017 |
| CN | 106647061 A |   | 5/2017 |
| CN | 106918959 A |   | 7/2017 |
| CN | 109407421 A |   | 3/2019 |

OTHER PUBLICATIONS

Jianliang Wang, the International Searching Report, dated Jul. 2019, CN.

* cited by examiner

PIXEL STRUCTURE COMPRISING TWO RED SUB-PIXELS HAVING EQUAL AREAS, TWO GREEN SUB-PIXELS HAVING EQUAL AREAS, AND A BLUE SUB-PIXEL HAVING A GREATER AREA THAN THE TWO GREEN SUB-PIXELS AND A SMALLER AREA THAN THE TWO RED SUB-PIXELS

CROSS REFERENCE OF RELATED APPLICATIONS

This application claims the priority to the Chinese Patent Application No. 201811321376.7, filed with National Intellectual Property Administration, PRC on Nov. 7, 2018 and entitled "PIXEL STRUCTURE AND DISPLAY DEVICE THEREOF", which is incorporated herein by reference in its entirety.

TECHNICAL FIELD

This application relates to the field of display technologies, and in particular, to a pixel structure, display panel and a display device that increase a color temperature of a panel and increase efficiency of a backplane.

BACKGROUND

The statements herein only provide background information related to this application, and do not necessarily constitute the prior art.

Due to many advantages, such as a thin body, power saving, and no radiation, etc., liquid crystal displays are widely used in the liquid crystal display industry, for example, used in liquid crystal TVs, mobile phones, personal digital assistants, digital cameras, computer screens, or laptop screens, etc., which dominate the field of panel displaying.

Various forms of pictures displayed on thin transistor liquid crystal displays (TFT-LCD) are formed through mixing of three primary colors of red (R), green (G), and blue (B), and different brightnesses thereof are achieved through control of liquid crystal rotation by using a voltage. In the prior art, a white tracking technology is adopted to add white (W) sub-pixels so as to provide transmittance, thereby adjusting a color temperature. However, using the white tracking technology requires expansion of memory of a TCON (a logic board), which increases power consumption of the timer control register (TCON), failing to save energy. In addition, because the white sub-pixel has no hue, and only increases light transmittance in the panel picture, changing the three primary colors of red (R), green (G), and blue (B) into four primary colors of red (R), green (G), blue (B), and white (W) sacrifices quality of the picture.

In a display picture of the TFT-LCD, since blue has a shorter wavelength, and has higher transmittance than red and green at a same voltage, blue brings people a display picture with a cold visual sense. Red and green have longer wavelengths than blue and are easier to be absorbed than blue. Therefore, mixing efficiency of the three primary colors of RGB is relatively low.

The TFT-LCD does not have a self-luminous function and requires a backlight module to provide a light source. However, backlight efficiency of a current TFT-LCD is relatively low. In order to ensure sufficient brightness, large backlight heat is generated.

Therefore, in the technical field of thin transistor liquid crystal displays (TFT-LCD), improving a color temperature of a display picture of a display panel, providing relatively good light transmittance, improving backlight efficiency, avoiding large backlight heat, and minimizing production costs are current purposes in the field of TFT-LCDs.

SUMMARY

A purpose of this application is to provide a display panel and a display device. Based on the mixing of the three primary colors of red (R), green (G), and blue (B) in the prior art, this application designs and manufactures a pixel structure that improves a color temperature of a panel.

This application is implemented by using the following technical solutions. A pixel structure according to this application includes: a plurality of pixel regions each including a plurality of sub-pixels. The plurality of sub-pixels of each pixel area include the first sub-pixel, and the first sub-pixel is configured at the center of each pixel area; sub-pixels of the remaining colors in the plurality of sub-pixels of each pixel area are centered on the first sub-pixel, configured on both sides of the first sub-pixel.

According to the pixel structure in one or more embodiments of this application, each group of the plurality of pixel regions includes an odd number of sub-pixels, and the first sub-pixel is a blue sub-pixel.

According to the pixel structure in one or more embodiments of this application, the sub-pixels in each group of the plurality of pixel regions are arranged, in ascending order of wavelength after light transmission, in a same direction by using the first sub-pixel as a center.

According to the pixel structure in one or more embodiments of this application, the sub-pixels in each group of the plurality of pixel regions are symmetrically arranged from inside to outside in ascending order of wavelength after light transmission.

According to the pixel structure in one or more embodiments of this application, each group of the plurality of pixel regions includes a second sub-pixel and a third sub-pixel, where the second sub-pixel is a green sub-pixel, and the third sub-pixel is a red sub-pixel.

According to the pixel structure in one or more embodiments of this application, each group of the plurality of pixel regions includes a second sub-pixel and a third sub-pixel, where the second sub-pixel is a red sub-pixel, and the third sub-pixel is a green sub-pixel.

According to the pixel structure in one or more embodiments of this application, each group of the plurality of pixel regions includes a second sub-pixel and a third sub-pixel, where the second sub-pixel on a left side of the pixel region is a red sub-pixel, the third sub-pixel on the left side is a green sub-pixel, the second sub-pixel on a right side of the pixel region is a green sub-pixel, and the third sub-pixel on the right side is a red sub-pixel if the first sub-pixel is used as a center.

According to the pixel structure in one or more embodiments of this application, each group of the plurality of pixel regions includes a second sub-pixel and a third sub-pixel, where the second sub-pixel on a left side of the pixel region is a green sub-pixel, the third sub-pixel on the left side is a red sub-pixel, the second sub-pixel on a right side of the pixel region is a red sub-pixel, and the third sub-pixel on the right side is a green sub-pixel if the first sub-pixel is used as a center.

According to the pixel structure in one or more embodiments of this application, in the sub-pixels in each group of the plurality of pixel regions, colors corresponding to the second sub-pixel and the third sub-pixel on the left side and the second sub-pixel and the third sub-pixel on the right side are arranged in a staggered manner by using the first sub-pixel as a center.

According to the pixel structure in one or more embodiments of this application, in the sub-pixels in each group of the plurality of pixel regions, respective areas of the first sub-pixel, the second sub-pixel, and the third sub-pixel are equal.

According to the pixel structure in one or more embodiments of this application, in the sub-pixels in each group of the plurality of pixel regions, respective areas of the first sub-pixel, the second sub-pixel, and the third sub-pixel are different.

According to the pixel structure in one or more embodiments of this application, in the sub-pixels in each group of the plurality of pixel regions, respective areas of the first sub-pixel, the second sub-pixel, and the third sub-pixel are partially equal.

Another purpose of this application is to provide a display panel, including: a first substrate having a plurality of pixel regions each including a plurality of sub-pixels; a second substrate arranged opposite to the first substrate; and a color filter layer including a plurality of color resist layers and formed on one of the first substrate and the second substrate, where the plurality of color resist layers are arranged corresponding to positions and colors of the plurality of pixel regions. The plurality of sub-pixels of each pixel area include the first sub-pixel, and the first sub-pixel is configured at the center of each pixel area; sub-pixels of the remaining colors in the plurality of sub-pixels of each pixel area are centered on the first sub-pixel, configured on both sides of the first sub-pixel. The plurality of color resist layers include a red color resist layer, a green color resist layer, and a blue color resist layer. Each of the pixel regions includes a first sub-pixel, two second sub-pixels, and two third sub-pixels. The first sub-pixel is located at the center of each of the pixel regions, the second sub-pixels are respectively located on a left side and a right side of the first sub-pixel, and the third sub-pixels are respectively located on sides of the two second sub-pixels, or the second sub-pixels and the third sub-pixels are arranged on two sides of the first sub-pixel in the following manner: sub-pixels of a same color are arranged in a same direction.

A purpose of this application is to provide a display device, including: a controller and a display panel, where the display panel is controlled by the controller, and the display panel includes: a first substrate having a plurality of pixel regions each including a plurality of sub-pixels; a second substrate arranged opposite to the first substrate; and a color filter layer including a plurality of color resist layers and formed on one of the first substrate and the second substrate, where the plurality of color resist layers are arranged corresponding to positions and colors of the plurality of pixel regions. The plurality of sub-pixels of each pixel area include the first sub-pixel, and the first sub-pixel is configured at the center of each pixel area; sub-pixels of the remaining colors in the plurality of sub-pixels of each pixel area are centered on the first sub-pixel, configured on both sides of the first sub-pixel. The plurality of color resist layers include a red color resist layer, a green color resist layer, and a blue color resist layer. Each of the pixel regions includes a first sub-pixel, two second sub-pixels, and two third sub-pixels. The first sub-pixel is located at the center of each of the pixel regions, the second sub-pixels are respectively located on a left side and a right side of the first sub-pixel, and the third sub-pixels are respectively located on sides of the two second sub-pixels, or the second sub-pixels and the third sub-pixels are arranged on two sides of the first sub-pixel in the following manner: sub-pixels of a same color are arranged in a same direction.

In this application, the pixel structure of the display panel is changed, so that the color temperature of the display picture of the display panel can be improved. In addition, backlight illumination efficiency and transmittance are improved, so that a picture brightness of a display region is more uniform, effectively avoiding severe backlight heating, etc.

BRIEF DESCRIPTION OF DRAWINGS

To describe the technical solutions of the embodiments of this application more clearly, the following briefly describes the accompanying drawings required for describing the embodiments. It should be understood that, the following accompanying drawings show only some embodiments of this application, which cannot be considered as limitation on the scope. A person of ordinary skill in the art may still derive other accompanying drawings from the accompanying drawings without creative efforts.

DETAILED DESCRIPTION OF EMBODIMENTS

Figure 1:
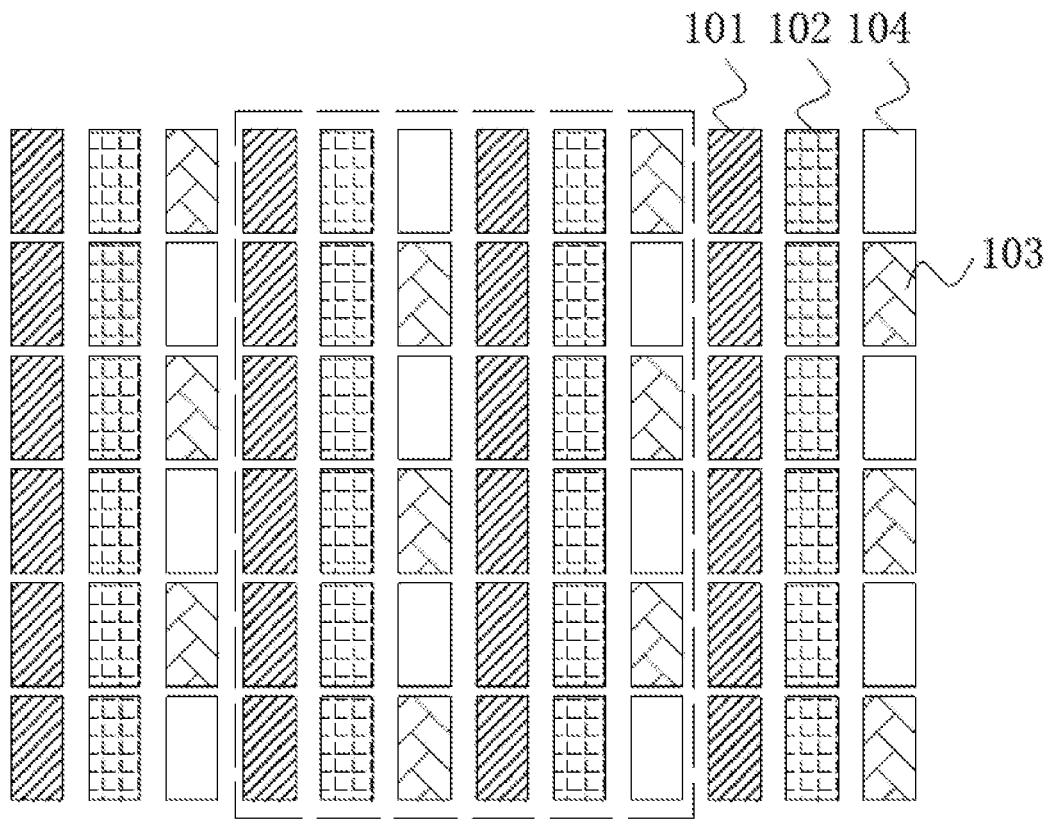
FIG. 1 is an exemplary diagram of a display panel pixel structure.

The following embodiments are described with reference to the accompanying drawings, and are used to exemplify particular embodiments that this application can be used to implement. The directional terms mentioned in this application, for example, "upper", "lower", "before", "after", "left", "right", "inside", "outside", and "side", are only references to the directions in the drawings. Therefore, the used direction terms are intended to describe and understand this application, but are not intended to limit this application.

The drawings and description are considered to be illustrative in nature rather than restrictive. In the figures, structurally similar devices are denoted by the same reference numerals. In addition, for understanding and ease of description, the size and thickness of each component in the drawings are arbitrarily shown, but this application is not limited to this.

In the accompanying drawings, the thicknesses of layers, films, panels, regions, and the like are enlarged for clarity. In the accompanying drawings, the thicknesses of some layers and regions are enlarged for understanding and ease of description, It is to be understood that, when a component such as a layer, film, region or substrate is referred to as being "on" another component, the component may be directly on the another component, or an intermediate component may exist.

In addition, in this specification, unless explicitly described to the contrary, the word "including" is to be understood to mean including the component but not excluding any other component. Besides, in this specification, "on" means that it is above or below the target component and does not mean that it is necessary to be on top based on the direction of gravity.

In order to further explain technical means and effects adopted in this application to achieve the intended purposes of the application, a pixel structure and a display device according to this application, specific implementations, structures, characteristics, and effects thereof are described in detail below with reference to the drawings and specific embodiments.

FIG. 1 is an exemplary schematic diagram of a display panel pixel structure. The display panel pixel structure includes: a first color sub-pixel 101, a second color sub-pixel 102, a third color sub-pixel 103, and a white sub-pixel 104 distributed in an array. However, the white sub-pixel 104 in the display panel actually has no hue, only increasing light transmittance but sacrificing quality of a picture. Furthermore, the white sub-pixel occupies memory of a timer control register (TCON), and increases power consumption of the TCON.

Figure 2:
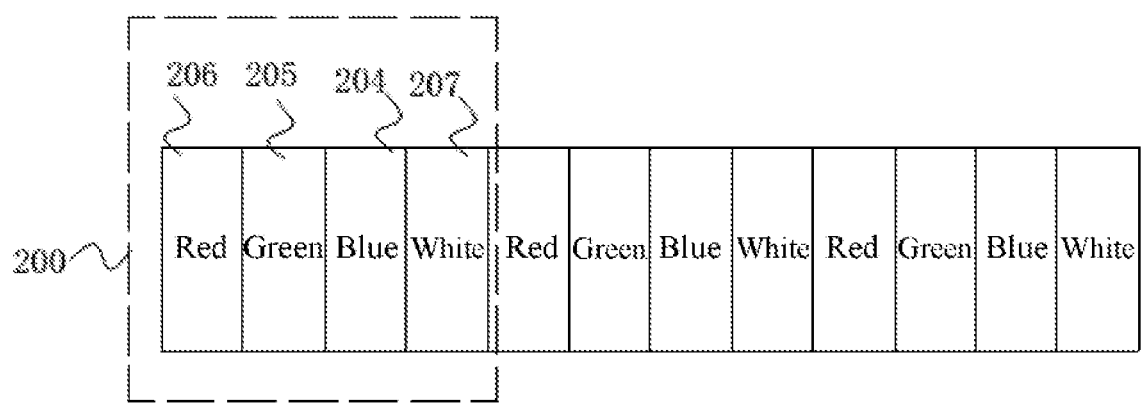
FIG. 2 is a distribution diagram of a pixel structure with four-color sub-pixels in the art.

FIG. 2 is a distribution diagram of a pixel structure with four-color sub-pixels. The pixel structure includes a pixel region 200, a blue sub-pixel 204, a green sub-pixel 205, a red sub-pixel 206, and a white sub-pixel 207.

Figure 3:
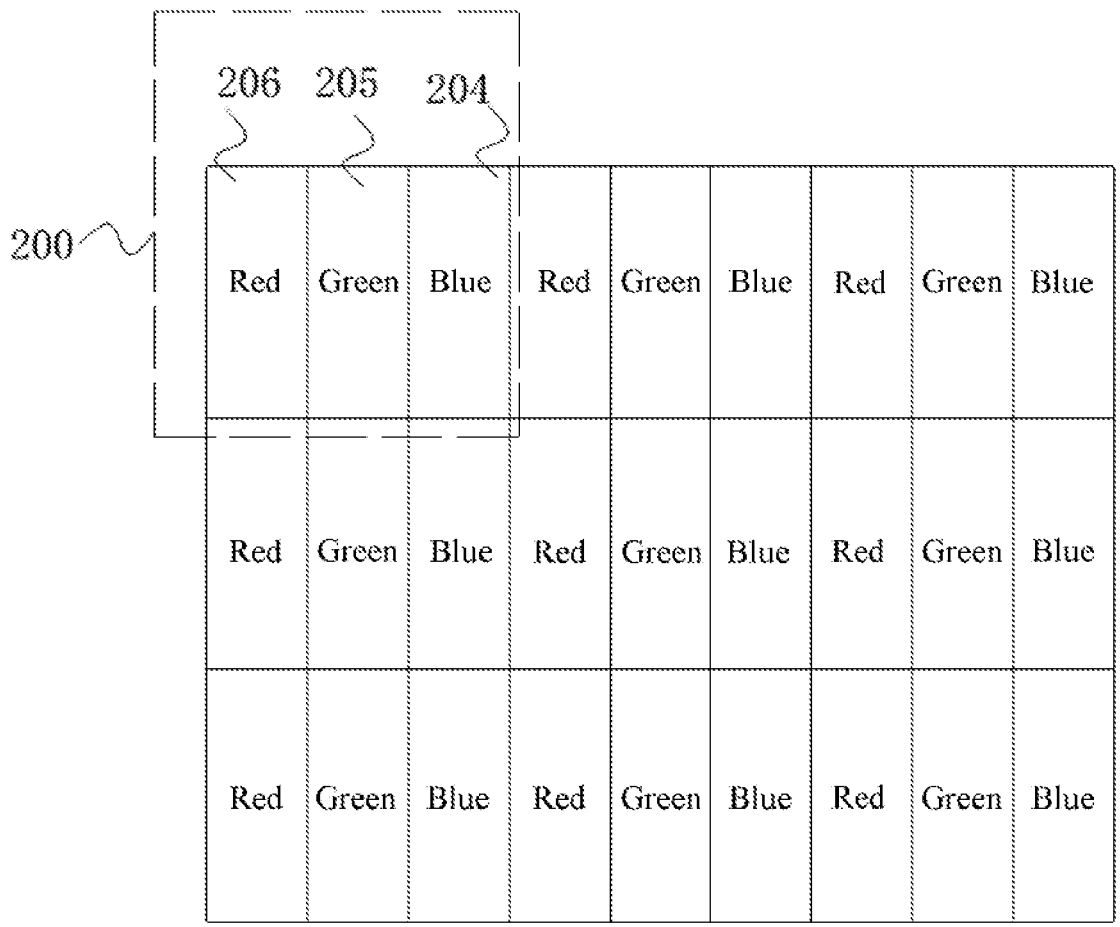
FIG. 3 is a distribution diagram of a conventional pixel structure according to an embodiment of this application.

FIG. 3 is a distribution diagram of a conventional pixel structure. One pixel structure includes a plurality of pixel regions 200, and each of the plurality of pixel regions has three sub-pixels: the pixel region 200, the blue sub-pixel 204, the green sub-pixel 205, and the red sub-pixel 206.

Figure 4:
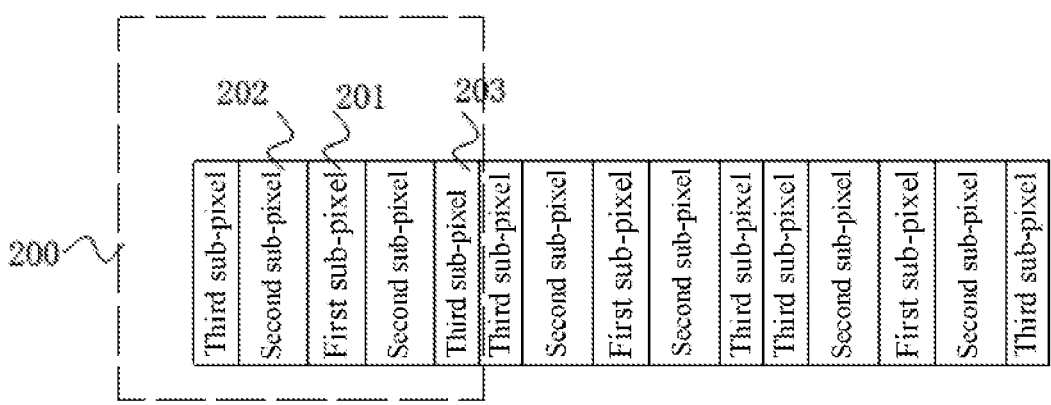
FIG. 4 is a distribution diagram of sub-pixels of a pixel structure according to an embodiment of this application.

FIG. 4 is a distribution diagram of sub-pixels of a pixel structure according to an embodiment of this application. The pixel region 200 includes five sub-pixels: one first sub-pixel 201, two second sub-pixels 202, and two third sub-pixels 203. However, this application is not limited thereto, and other pixel structures of a same form or other related pixel structures are also included in this application.

Referring to FIG. 4, a pixel structure according to this application includes: a plurality of pixel regions 200 each including a plurality of sub-pixels. The plurality of sub-pixels of each pixel area include the first sub-pixel, and the first sub-pixel 201 is configured at the center of each pixel area; sub-pixels of the remaining colors in the plurality of sub-pixels of each pixel area are centered on the first sub-pixel, configured on both sides of the first sub-pixel.

Figure 5:
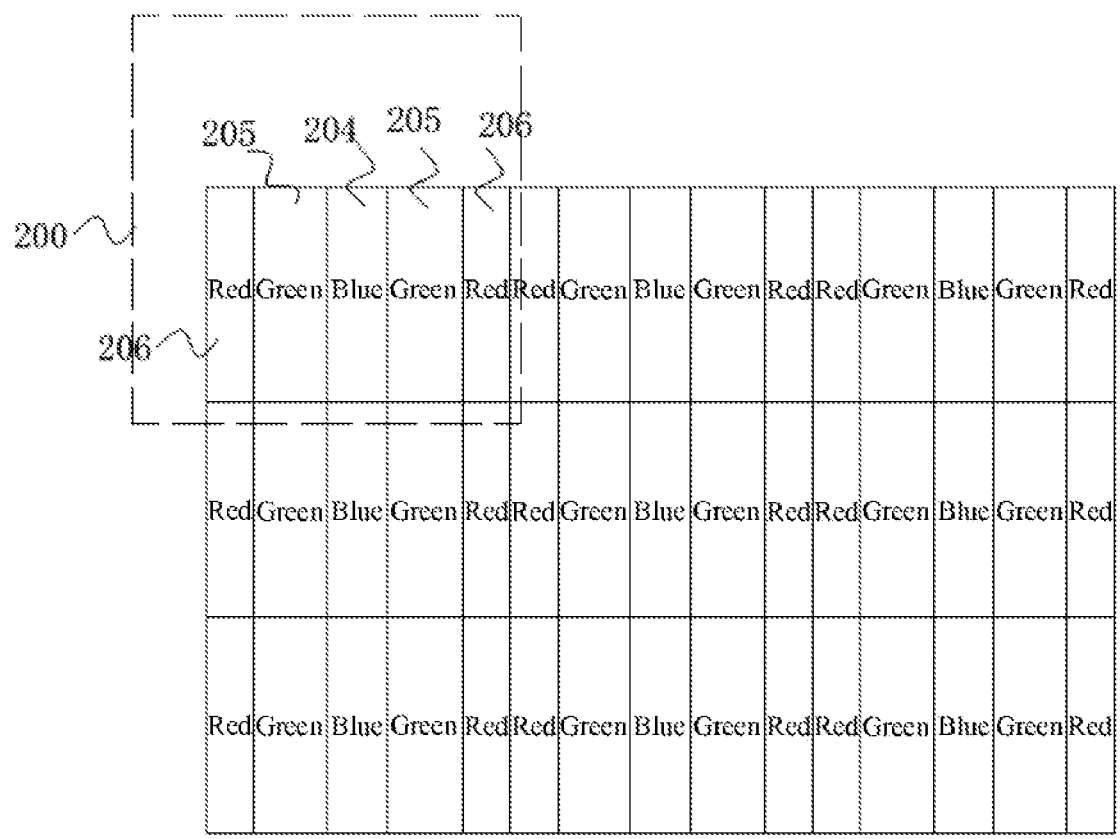
FIG. 5 is a distribution diagram of a typical pixel structure according to an embodiment of this application.

FIG. 5 is a distribution diagram of a new pixel structure according to an embodiment of this application. According to the pixel structure, each group of the plurality of pixel regions 200 has an odd number of sub-pixels, and the first sub-pixel 201 is a blue sub-pixel 204. However, this application is not limited thereto, and other pixel structures of a same form or other related pixel structures are also included in this application.

FIG. 4 is a distribution diagram of sub-pixels of a pixel structure. With reference to a distribution diagram of a typical pixel structure in FIG. 5, it may be learned that each group of the plurality of pixel regions 200 includes a second sub-pixel 202 and a third sub-pixel 203. The second sub-pixel 202 is a green sub-pixel 205, and the third sub-pixel 203 is a red sub-pixel 206. However, this application is not limited thereto, and other pixel structures of a same from or other related pixel structures are also included in this application.

Figure 6A:
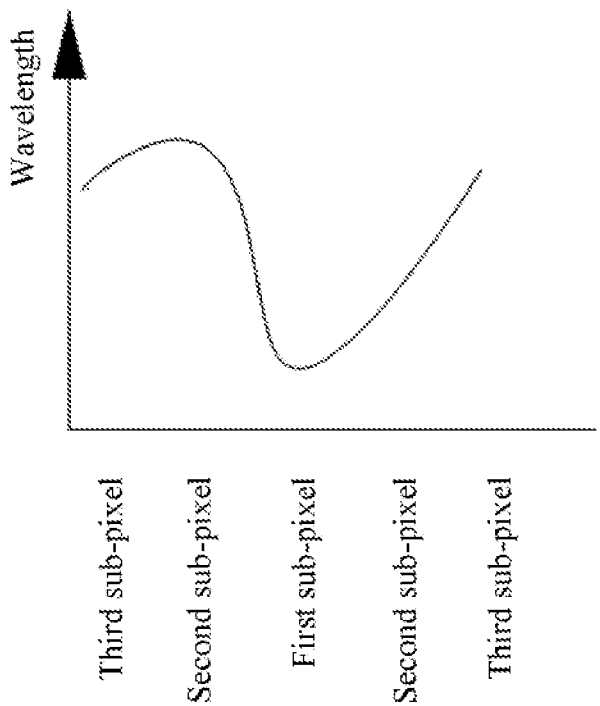
FIG. 6 is a distribution diagram of wavelengths of sub-pixels according to an embodiment of this application.

FIG. 6A is a distribution diagram of wavelengths of sub-pixels according to an embodiment of this application. According to the pixel structure, the sub-pixels in each group of the plurality of pixel regions 200 are arranged, in ascending order of wavelength after light transmission, in a same direction by using the first sub-pixel as 201 a center. However, this application is not limited thereto, and other sub-pixel wavelengths of a same form or other related sub-pixel wavelengths are also included in this application.

Figure 6B:
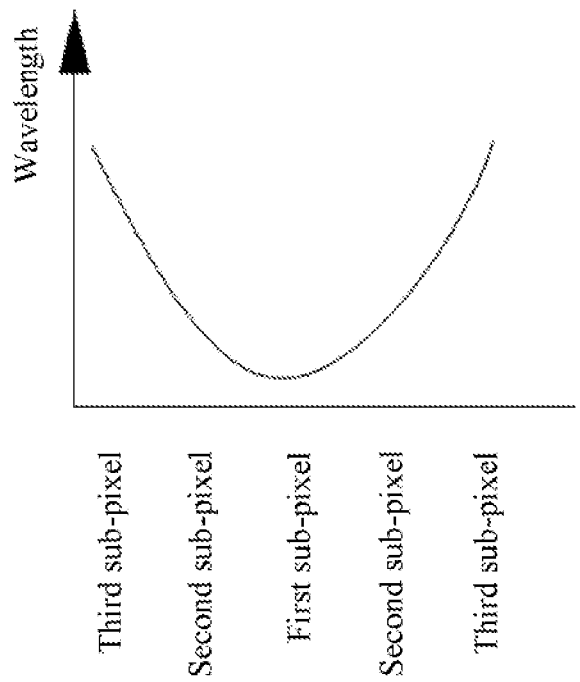

In an embodiment of this application, referring to FIG. 6B, according to the pixel structure, the sub-pixels in each group of the plurality of pixel regions are symmetrically arranged from inside to outside in ascending order of wavelength after light transmission. However, this application is not limited thereto, and other sub-pixel wavelengths of a same form or other related sub-pixel wavelengths are also included in this application.

Figure 7:
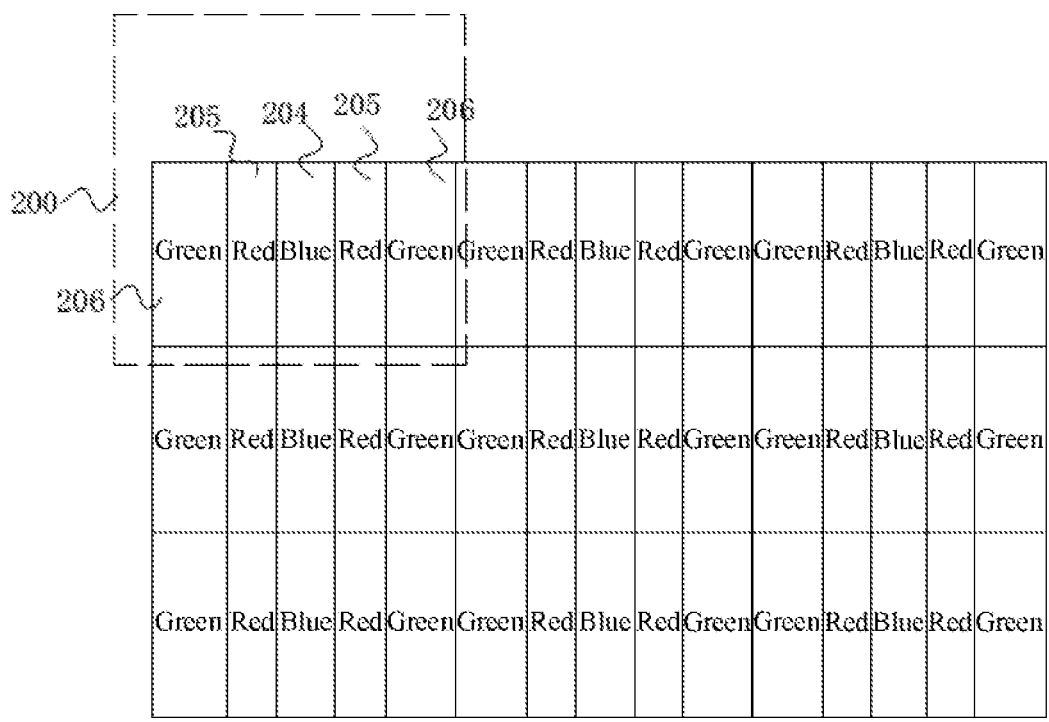
FIG. 7 is a symmetrical distribution diagram of colors of a pixel structure according to an embodiment of this application.

FIG. 7 is a symmetrical distribution diagram of colors of a pixel structure. With reference to a distribution diagram of a typical pixel structure in FIG. 5, in one or more embodiments of this application, each group of the plurality of pixel regions 200 includes a second sub-pixel 202 and a third sub-pixel 203. The second sub-pixel 202 is a red sub-pixel 206, and the third sub-pixel 203 is a green sub-pixel 205. However, this application is not limited thereto.

Figure 8:
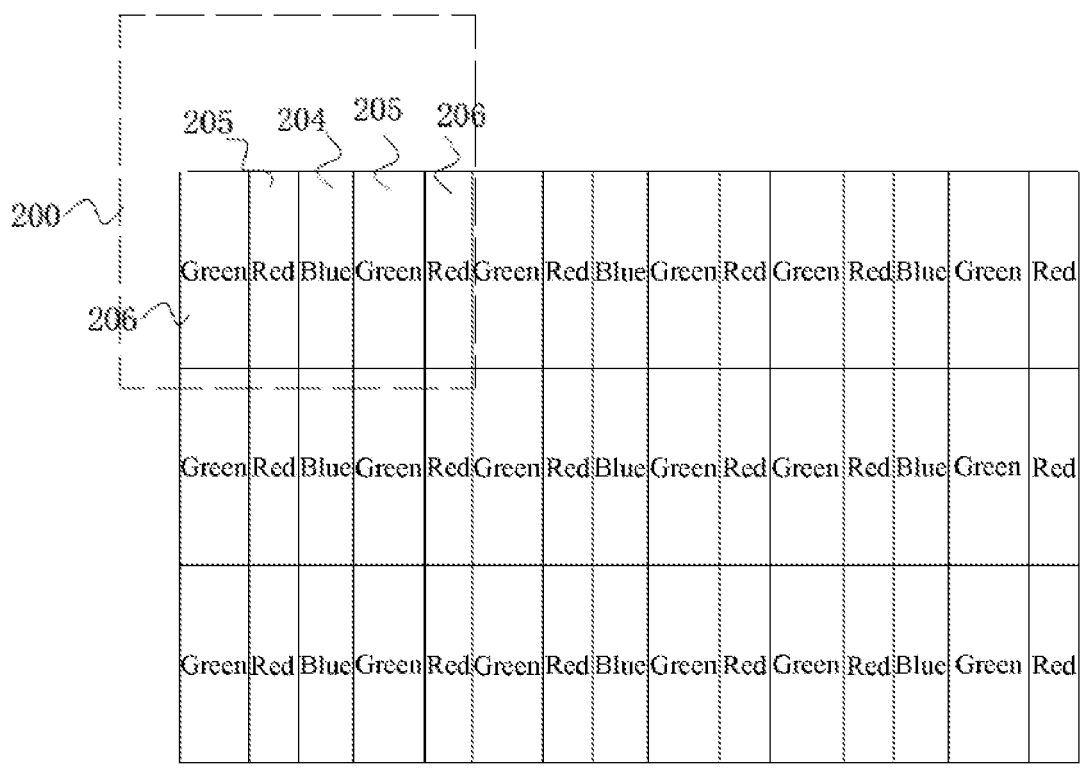
FIG. 8 is a centrosymmetric distribution diagram of a pixel structure according to an embodiment of this application.

FIG. 8 is a centrosymmetric distribution diagram of a pixel structure according to an embodiment of this application. According to the pixel structure in one or more embodiments of this application, each group of the plurality of pixel regions includes a second sub-pixel 202 and a third sub-pixel 203. The second sub-pixel 202 on a left side of the pixel region 200 is a red sub-pixel 206, the third sub-pixel 203 on the left side is a green sub-pixel 205, the second sub-pixel 202 on a right side of the pixel region 200 is a green sub-pixel 205, and the third sub-pixel 203 on the right side is a red sub-pixel 206 if the first sub-pixel 201 is used as a center. This application is not limited thereto.

Figure 9:
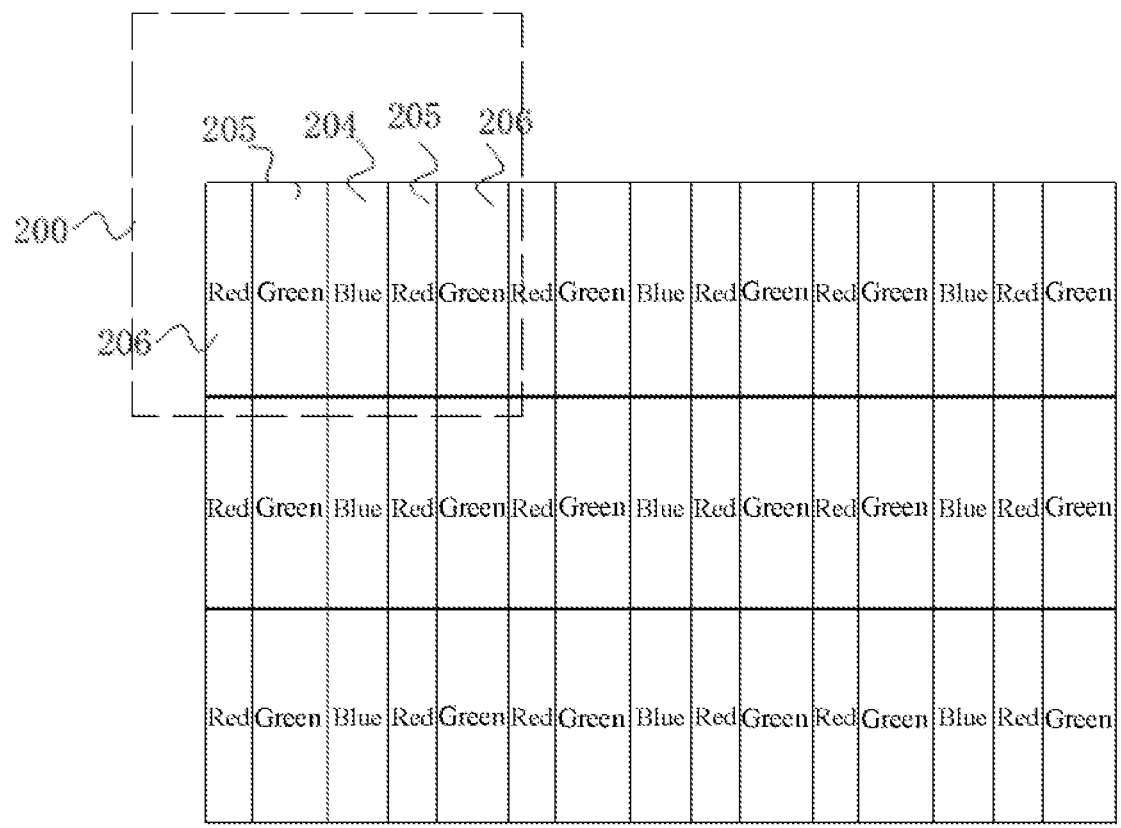
FIG. 9 is a diagram in which colors of a pixel structure are arranged in a same direction according to an embodiment of this application.

FIG. 9 is a diagram in which colors of a new pixel structure are arranged in a same direction according to an embodiment of this application. Each group of the plurality of pixel regions 200 includes a second sub-pixel 202 and a third sub-pixel 203. The second sub-pixel 202 on a left side of the pixel region is a green sub-pixel 205, the third sub-pixel 203 on the left side is a red sub-pixel 206, the second sub-pixel 202 on a right side of the pixel region is a red sub-pixel 206, and the third sub-pixel 203 on the right side is a green sub-pixel 205 if the first sub-pixel 201 is used as a center. However, this application is not limited thereto.

In one or more embodiments of this application, in the sub-pixels in each group of the plurality of pixel regions, as shown in FIG. 8 and FIG. 9, colors corresponding to the second sub-pixel 202 and the third sub-pixel 203 on the left side and the second sub-pixel 202 and the third sub-pixel 203 on the right side are arranged in a staggered manner by using the first sub-pixel 201 as a center. However, this application is not limited to the pixel color. In this embodiment, different sub-pixel arrangements corresponding to the sub-pixels are changed, so that brightness and backlight efficiency of the display picture are improved, and the display picture is more uniform, increasing the color temperature of the display picture.

Figure 10:
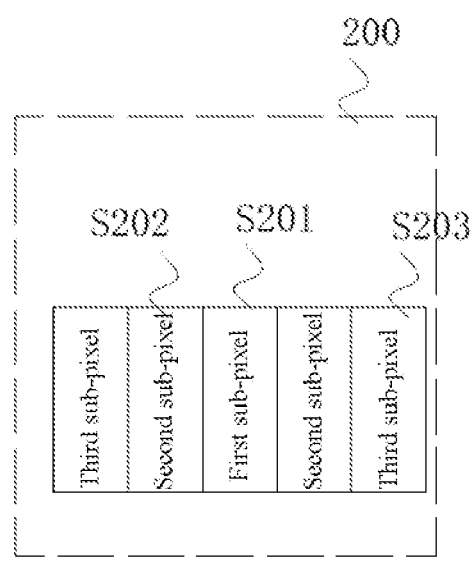
FIG. 10 is a diagram of a pixel structure in which sub-pixels have an equal area according to an embodiment of this application.

FIG. 10 is a diagram of a pixel structure in which sub-pixels have an equal area according to an embodiment of this application. In the sub-pixels in each group of the plurality of pixel regions 200, respective areas of the first sub-pixel 201, the second sub-pixel 202, and the third sub-pixel 203 are equal, that is, S201 is equal to S202, and S202 is equal to S203.

Figure 11:
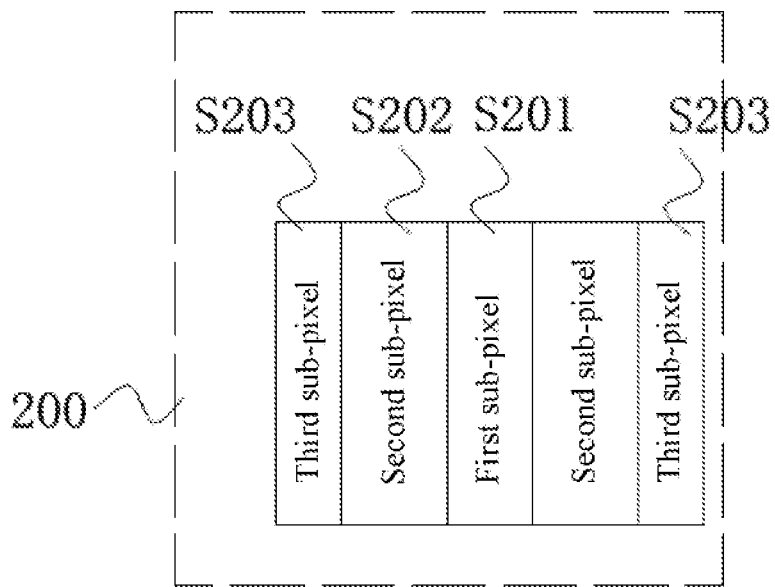
FIG. 11 is a diagram of a pixel structure in which sub-pixels have different areas according to an embodiment of this application.

FIG. 11 is a diagram of a pixel structure in which sub-pixels have different areas according to an embodiment of this application. In the sub-pixels in each group of the plurality of pixel regions 200, respective areas of the first sub-pixel 201, the second sub-pixel 202, and the third sub-pixel 203 are different, that is, S201 is greater than S203, and S202 is greater than S201. In this embodiment, the sub-pixel area corresponding to each of the sub-pixels is properly changed, so that the light transmittance of the pixel region is increased.

Figure 12:
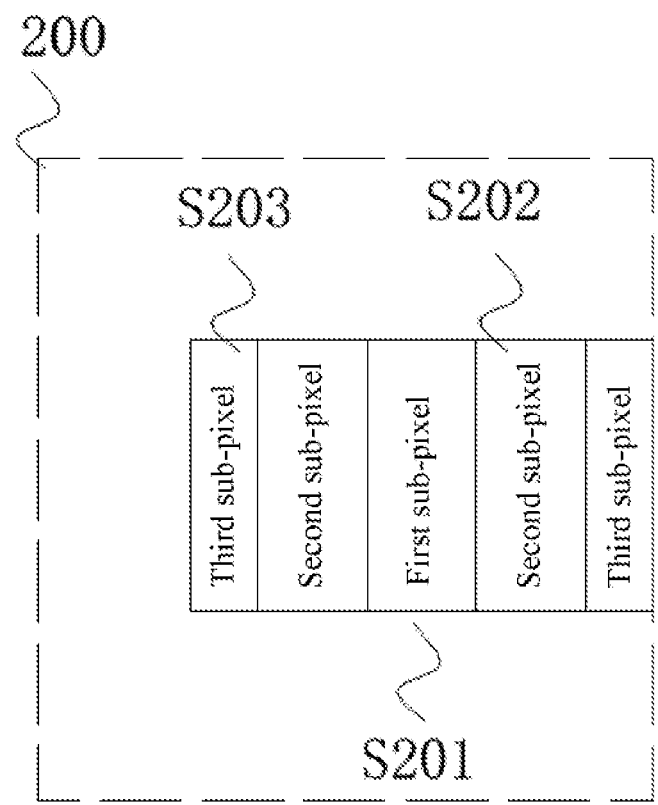
FIG. 12 is a diagram of a pixel structure in which sub-pixels have partially equal areas according to an embodiment of this application.

FIG. 12 is a diagram of a pixel structure in which sub-pixels have partially equal areas according to an embodiment of this application. In the sub-pixels in each group of the plurality of pixel regions 200, respective areas of the first sub-pixel 201, the second sub-pixel 202, and the third sub-pixel 203 are partially equal, that is, S201 is equal to S202, and S202 is greater than S203. In this embodiment, the sub-pixel area corresponding to each of the sub-pixels is properly changed, so that the light transmittance of the pixel region is increased.

Figure 13:
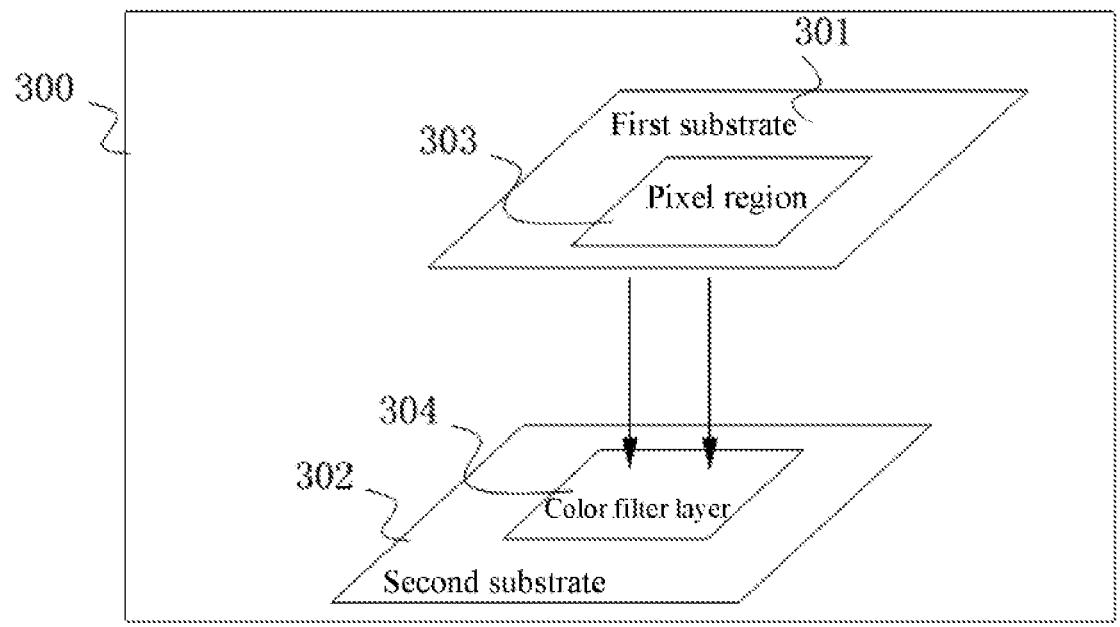
FIG. 13 is a pixel structure diagram of a display panel according to an embodiment of this application.

With reference to a pixel structure diagram of a display panel in FIG. 13, the display panel provided in this application includes: a first substrate having a plurality of pixel regions each including a plurality of sub-pixels; a second substrate arranged opposite to the first substrate; and a color filter layer including a plurality of color resist layers and formed on one of the first substrate and the second substrate, where the plurality of color resist layers are arranged corresponding to positions and colors of the plurality of pixel regions. The plurality of sub-pixels of each pixel area include the first sub-pixel, and the first sub-pixel 201 is configured at the center of each pixel area; sub-pixels of the remaining colors in the plurality of sub-pixels of each pixel area are centered on the first sub-pixel, configured on both sides of the first sub-pixel. The plurality of color resist layers include a red color resist layer, a green color resist layer, and a blue color resist layer. Each of the pixel regions includes a first sub-pixel, two second sub-pixels, and two third sub-pixels. The first sub-pixel is located at the center of each of the pixel regions, the second sub-pixels are respectively located on a left side and a right side of the first sub-pixel, and the third sub-pixels are respectively located on sides of the two second sub-pixels, or the second sub-pixels and the third sub-pixels are arranged on two sides of the first sub-pixel in the following manner: sub-pixels of a same color are arranged in a same direction.

Figure 14:
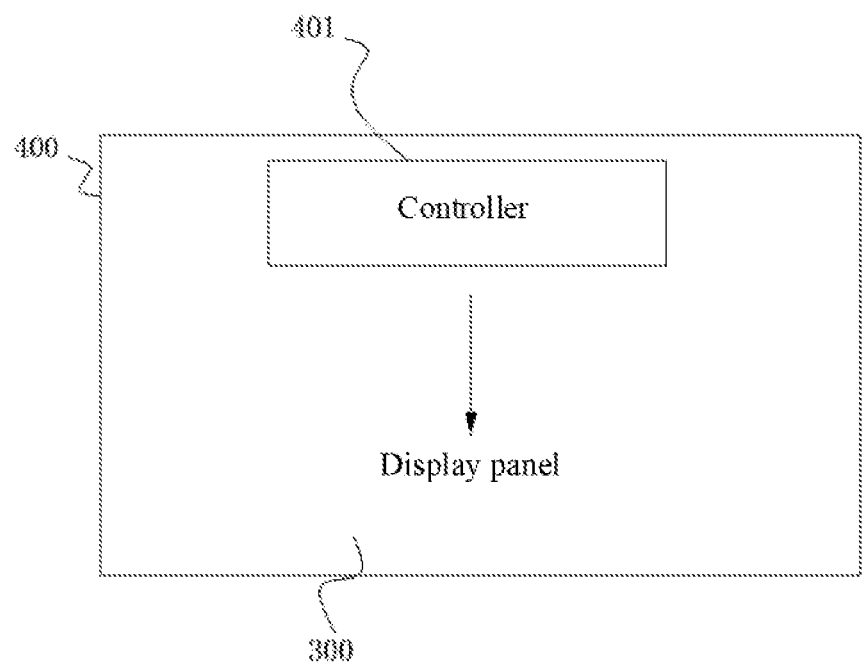
FIG. 14 is a structural diagram of a display device according to this application.

This application provides a display device. As shown in FIG. 14, the display device 400 includes: a controller 401 and a display panel 300. The display panel is controlled by the controller, and the display panel includes: a first substrate having a plurality of pixel regions each including a plurality of sub-pixels; a second substrate arranged opposite to the first substrate; and a color filter layer including a plurality of color resist layers and formed on one of the first substrate and the second substrate, where the plurality of color resist layers are arranged corresponding to positions and colors of the plurality of pixel regions. The plurality of sub-pixels of each pixel area include the first sub-pixel, and the first sub-pixel 201 is configured at the center of each pixel area; sub-pixels of the remaining colors in the plurality of sub-pixels of each pixel area are centered on the first sub-pixel, configured on both sides of the first sub-pixel. The plurality of color resist layers include a red color resist layer, a green color resist layer, and a blue color resist layer. Each of the pixel regions includes a first sub-pixel, two second sub-pixels, and two third sub-pixels. The first sub-pixel is located at the center of each of the pixel regions, the second sub-pixels are respectively located on a left side and a right side of the first sub-pixel, and the third sub-pixels are respectively located on sides of the two second sub-pixels, or the second sub-pixels and the third sub-pixels are arranged on two sides of the first sub-pixel in the following manner: sub-pixels of a same color are arranged in a same direction.

In this application, the pixel structure of the display panel is changed, and the sub-pixel area corresponding to each of the sub-pixels and the different sub-pixel arrangements corresponding to the sub-pixels are properly changed, so that the light transmittance of the pixel region is improved, area proportions of the blue sub-pixel and the red sub-pixel in the pixel region are reduced, and an area proportion of the green sub-pixel in the pixel region is improved, thereby improving the color temperature of the display panel, providing good display brightness, and improving the backlight efficiency. Therefore, picture brightness of the display region is more uniform. This application does not require a manufacturing process to be dramatically changed, and is suitable for various pixel structures, and has relatively high pertinence.

The terms such as "in some embodiments" and "in various embodiments" are repeatedly used. The terms used usually do not refer to the same embodiment, but the terms can also refer to the same embodiment. Words such as "comprise", "have" and "include" are synonyms, unless the context shows other meanings.

The above descriptions are merely optional embodiments of this application, and are not intended to restrict the application in any form. Although the utility model is described above with reference to the specific embodiments, the embodiments are not intended to limit the utility model. A person of skilled in the art may make some equivalent variations, alterations or modifications to the above-disclosed technical content without departing from the scope of the technical solutions of the utility model to obtain equivalent embodiments. However, any simple modification, equivalent change and modification made to the above embodiments according to the technical essence of the application without departing from the content of the technical solutions of the utility model shall fall within the scope of the technical solutions of the utility model.

What is claimed is:

1. A pixel structure, comprising:

a plurality of pixel regions, each of the pixel regions comprising a plurality of sub-pixels, wherein the plurality of sub-pixels of each pixel region comprise a first sub-pixel, which is disposed at a center of each pixel region; wherein sub-pixels of remaining colors in the plurality of sub-pixels of each pixel region are centered on the first sub-pixel and disposed on both sides of the first sub-pixel;

wherein the first sub-pixel of the pixel region is a blue sub-pixel, and a group of one green sub-pixel and one red sub-pixel is disposed on a left side of the blue sub-pixel, and another group of one green sub-pixel and one red sub-pixel is disposed on a right side of the blue sub-pixel; wherein the sub-pixel located at a leftmost position of the pixel region is a green sub-pixel;

wherein the sub-pixel located at a rightmost position of the pixel region is a green sub-pixel; wherein the two red sub-pixels have equal areas, and the two green sub-pixels have equal areas, wherein the blue sub-pixel has a greater area than the two green sub-pixels, and the red second sub-pixels each have a greater area than the blue sub-pixel.

* * * * *